Feb. 1, 1938.                R. B. PRICE                 2,107,119
                          EARTH MOVING DEVICE
                           Filed May 20, 1936           2 Sheets-Sheet 1
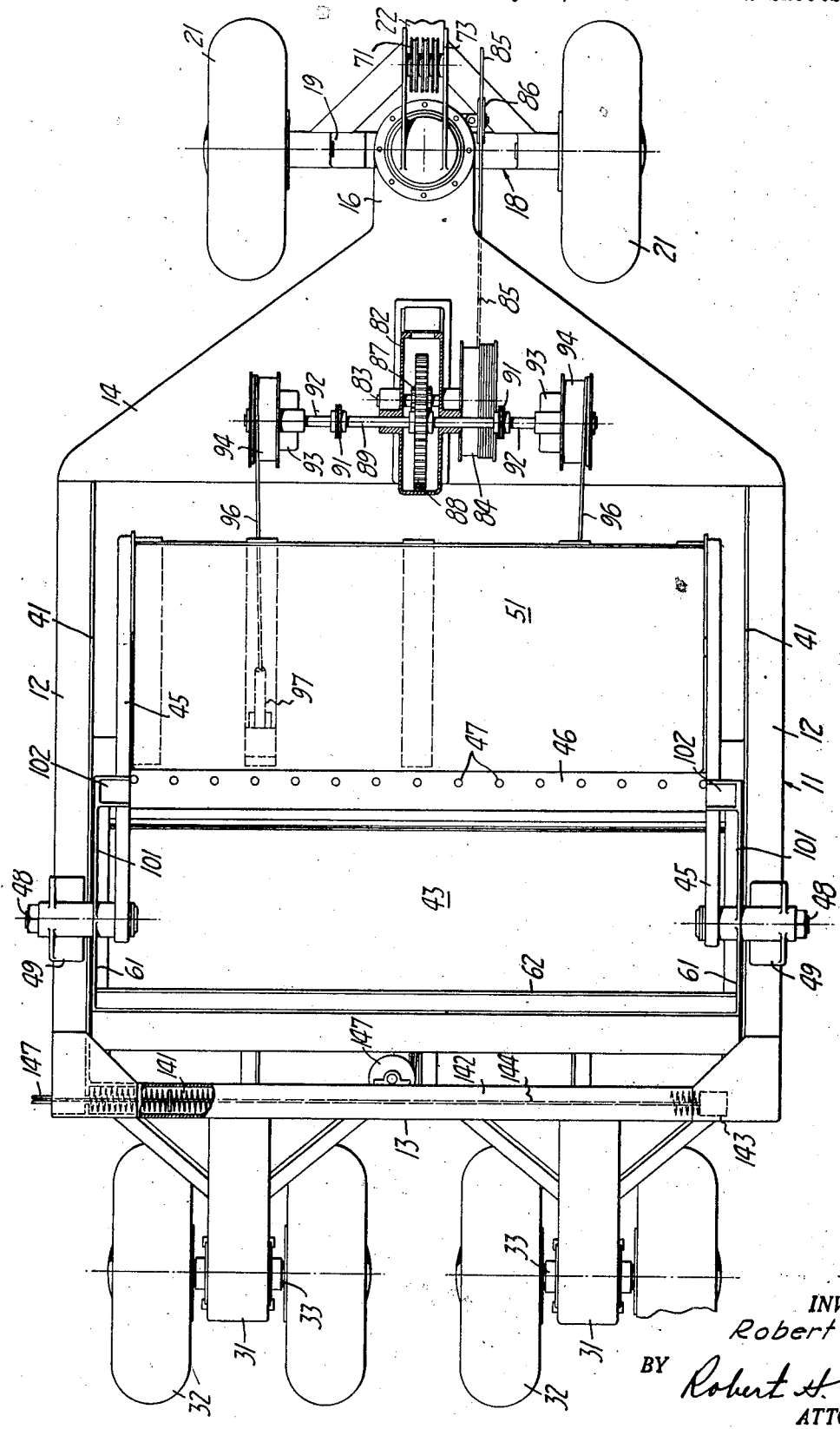
INVENTOR.
Robert B. Price
BY Robert H. Eckhoff
ATTORNEY

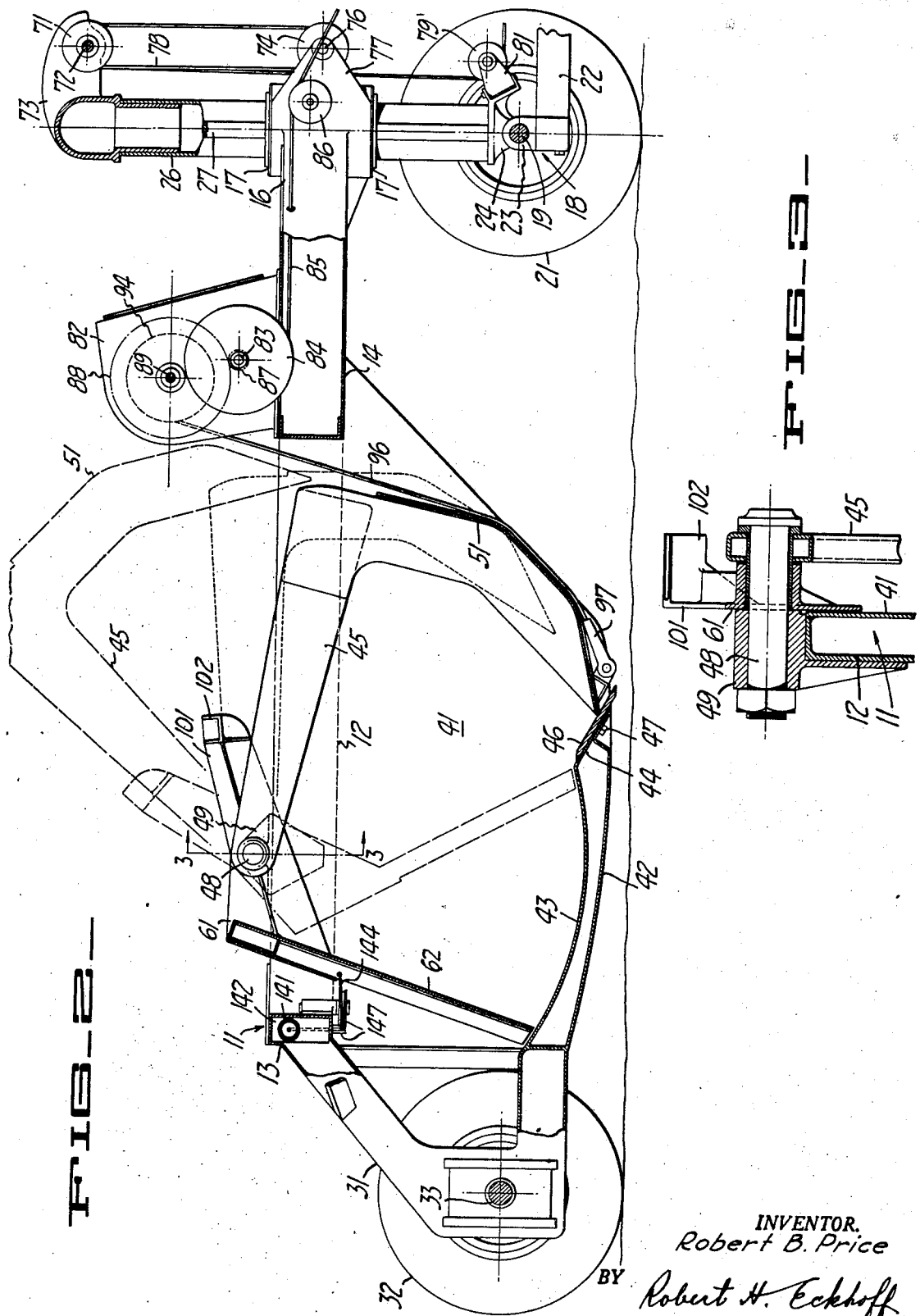

Patented Feb. 1, 1938

2,107,119

UNITED STATES PATENT OFFICE 2,107,119

EARTH MOVING DEVICE

Robert B. Price, Oakland, Calif., assignor to American Tractor Equipment Corporation, a corporation of California Application May 20, 1936, Serial No. 80,726

11 Claims. (Cl. 37—124)

This invention relates to a new and improved scraper structure and, more particularly, to an improvement upon that structure shown in the copending application of John F. Knapp, Serial No. 58,552, of January 10, 1936.

In numerous previous patents Le Tourneau has suggested the use of various structures to be operated by an extensive cable system. While these structures are functionally satisfactory, they are nevertheless objectionable in that they require such long lengths of cable that the cost of maintenance of the cable alone is far too high. In the machine of the present invention the control has been so simplified that but a single cable need be extended from the tractor to the scraper proper while the total length of cable involved in the operation of the scraper structure is materially reduced. In addition, my structure is so simple that I am able to use cable-sheaves and drums of such a large diameter that undue bending of the cable is obviated, the life of the cable being accordingly increased.

It is the general object of the present invention to simplify the control of a cable operated scraper structure, to reduce the number and the length of the cables employed, as well as the severity of use to which the cable is subjected, to the end that the cable operating costs may be materially reduced.

The invention includes other objects and features of advantage, some of which, together with the foregoing, will appear hereinafter, wherein the present preferred scraper structure of my invention is disclosed. In the drawings accompanying and forming a part of this specification, Figure 1 is a plan view of a scraper structure embodying my invention.

Figure 2 is a side elevation, partly in section.

Figure 3 is a section taken along the line 3—3 of Figure 2 illustrating the detail of construction at the hinge forming point.

The frame

The scraper of the present invention includes a strong steel frame 11 made up of a plurality of members, usually secured together by spot welding. This frame includes side members 12, end members 13 and a forward member 14 joining the side members 12 and extending forwardly to provide a support 16 in which are provided bearings 17.

A front truck 18, including an axle 19 upon which are positioned wheels 21, is provided to permit steering of the scraper. A draw bar 22 extends forwardly to be attached to a suitable hitch on such a vehicle as a tractor used to propel the scraper. The axle 19 carries a ball member 23 which is received in a socket 24 at the bottom of a post 26. This post extends through a bearing 17 and includes guides 27 thereon, cooperating with the bearing 17 to restrict the movement between the bearing and the post to only a sliding movement, rotational movement being prevented by the guides 27. At the rear of the frame truck support members 31 are provided, these members being suitably attached and braced to frame structure and extending to the rear of the scraper to permit suitable clearance for wheels 32.

The wheels 32 are provided in pairs, each pair being mounted upon an axle 33, each axle being carried in one of the supporting members 31.

The axle mounting is described in detail in the aforementioned Knapp case.

The bowl

Secured to the frame members 12 are suitable side plates 41. Between these side plates are extended a bottom plate 42 and an arcuate plate 43. At their forward ends these plates are joined together and thus provide a lip 44 to which is attached a suitable cutting blade 46, bolts 47 being usually utilized for this purpose so that the cutting blade can be readily changed or replaced.

Upon advancing the scraper over the ground the cutting blade 46 will cut off and pick up earth, this earth being deposited upon the arcuate plate 43 to be retained therein.

Since the point at which it is desired to dump a load from the scraper may be a considerable distance from the point at which the load is picked up, since transportation of the load may result in accidental discharge of a part thereof, I provide means for retaining the earth in the bowl. This means is shown as comprising two arms 45 carried upon stub shafts 48 which are in turn carried by brackets 49 on side frame members 12. These arms extend forwardly and provide a hoe-like door structure with transverse plates 51 which is welded between the arms 45. It is to be noted that plates 51 engage the cutting blade and thus insure a tight closure for the bowl.

To provide for removal of earth carried upon the bowl I support another pair of arms 61 from stub shafts 48 and extend between these arms an end gate in the form of a plate 62. It is to be noted that the center of the arcuate plate 43 is the center of the stub shafts 48 and that plate 62 will sweep over and wipe off earth upon the plate 43 so that the bowl can be readily emptied.

The blade elevating mechanism

Means are provided for raising and lowering the frame 11 so that the position of the cutting blade 46 relative to the earth can be adjusted. In the form disclosed this means comprises a plurality of pulleys 71 supported upon a shaft 72 carried by forwardly extending arms 73 on the post 26. A second set of pulleys indicated at 74 are supported upon a shaft 76 carried upon arms 77 are positioned upon the frame structure. A cable 78 is secured to the frame and is extended about the several pulleys to secure a multiplication in the power applied on cable 78. The cable extends about a guide pulley 79 positioned by support 81 for universal movement. The pulley extends to a suitable hoist mechanism, usually a hoist at the rear of a tractor.

The closure and end gate operating mechanism

In accordance with this invention, a very simple and yet practical form of operating mechanism is provided for the door and the end gate structure. A housing 82 is mounted upon the forward part of the frame portion 14 and carries journaled therein a shaft 83. Mounted upon one end of this shaft is a drum 84 to which is attached a cable 85 which extends forwardly over guide pulley 86 to a suitable cable operating mechanism on the tractor. The shaft 83 carries a pinion gear 87 which is enmeshed with a larger gear 88. Gear 88 is mounted upon a shaft 89 which is in turn journaled in the housing 82. Shaft 89 is connected by flexible couplings 91 to shafts 92, which are each supported on opposite sides of the housing 82 by suitable brackets 93. Mounted upon each of the shafts 92 are drums 94. From these drums extend the cables 96 which are attached as at 97 to the closure means.

It is to be noted that arms 61 each include an extension 101 thereon and that from this extension an ear 102 projects over each of the arms 45 so that arms 45 can only be moved a limited distance, between the full line position shown in Figure 2 and the intermediate dotted line position, before ears 102 are engaged. Thereafter, further rotational movement of arms 45 about the stub shafts will result in a rocking of the end gate 62 over the base of the bowl until finally the end gate is in the dash line position shown in Figure 2, and the closure means, including arms 45, have been moved to the extreme or uppermost position in which they appear in dash lines in Figure 2.

To provide for the return of the end gate I extend a spring 141 in a housing 142 transversely on the scraper bowl so as to secure a goodly length thereof. A piston 143 engages an end of this spring and to this piston is attached a cable 144. This cable is extended to the end gate about suitable guide pulleys 147 so that when the end gate is moved forward it is only against the bias of the spring so that the spring always urges the end gate to return to that position in which it appears in Figure 2.

Operation

While it is believed that the operation of the structure is relatively clear from the foregoing description, it will be again pointed out upon a pulling of cable 78, a raising and lowering of the cutting blade relative to the edge can be secured, the cable passing over suitable pulleys provided between the frame of the scraper and the post 26. As to operation of the bowl, once the bowl is filled it is raised relative to the earth, the door or closure means provided by arms 45 and plates 51 being lowered into position. Normally the scraper is operated in that intermediate position in which it appears in dotted lines in Figure 2 with the scraper blade being in contact with the earth. When the closure means is to be lowered, the operator simply releases the tension upon cable 85, the weight of the closure means causing it to drop into the full line position and plates 51 will be in engagement with the cutting blade 46 while arms 45 are above the dirt in the bowl.

When it is desired to dump the load, the operator operates the hoist pulling on cable 85. This results in rotation of drum 84 and a consequent rotation of both of drums 94 with a lifting of the door or closure means. During the initial movement of the closure means the end gate will not be moved. However, continued pulling on cable 85 results in continued rotation of the drums 94 and the consequent gradual raising of the closure means into that position in which it appears in Figure 2, well elevated above the bowl. During the movement of the end gate the spring has of course been placed under tension so that, upon the operator releasing the cable 85, the end gate is returned while the weight of the closure means causes it to rotate about the stub shafts and return to the full line position in which it appears in Figure 2. The operator usually stops the fall of the door when it is in the intermediate dotted line positon so that earth can be scraped up and gathered in the bowl.

It is to be pointed out that the load on the dirt moving gate is substantially uniform. Thus when the gate is first moved the load is made up of dirt on the bowl and little if any power is demanded by the spring. As the dirt is forced out over the cutting edge the dirt load decreases but more power is demanded by the spring. This results in a uniform loading on the cables and enables the operator to judge the operation of cleaning the bowl more accurately.

I claim:

1. A scraper comprising a bowl, means for discharging dirt therefrom including a gate hinged above said bowl and movable thereover to discharge dirt thereon, closure means for said bowl hinged above said bowl and including arms on each side of said bowl, means for lifting said closure means, and means extending from said gate and engaging said arms upon opening movement of said closure means.

2. A scraper comprising a bowl, means for discharging dirt therefrom including a gate hinged above said bowl and movable thereover to discharge dirt thereon, closure means for said bowl hinged above said bowl and movable over a path, and means extending from said gate beyond the hinge therefor and engaging said closure means during at least a portion of the travel of said closure means over said path.

3. In a scraper, an end gate, opposite spaced shafts, levers extending from said gate and supported on said shafts at an intermediate point along said levers, a door, arms hinging said door on said shaft, and means on said levers engaging said arms upon an upward movement of said door.

4. In a scraper, an end gate, opposite spaced shafts, levers extending from said gate and supported on said shafts at an intermediate point along said levers, a door, arms hinging said door on said shaft, and means on said levers projecting into the path of travel of said arms and engaging said arms upon an upward movement of said door.

5. In a scraper, an end gate, means supporting said gate for a swinging movement, a door, means supporting said door for a swinging movement, and means for interengaging said supporting means upon movement of said door supporting means whereby said gate is swung by movement of said door.

6. In a scraper, a frame, wheels at the rear end thereof, means supporting the front end thereof, a bowl carried by said frame and extending from in front of said wheels toward said frame front end, an end gate for ejecting dirt from said bowl, a door for closing said bowl, means hinging said door on said bowl, means hinging said gate on said bowl, means carried adjacent said frame front end for lifting said door, and means engaging said door hinging means with the gate hinging means upon lifting said door.

7. In a device of the character described, a bowl, an end gate, means supporting said gate for movement over said bowl to eject dirt therefrom, a door, means supporting said door above said bowl for raising and lowering with respect to said bowl, means for raising and lowering said door, means interengaging said gate supporting means with said door supporting means to effect movement of said gate with said door during at least a portion of the travel of said door upon raising of said door, and means for raising said door.

8. In a scraper, a frame, a bowl carried thereby, an end gate for ejecting dirt from said bowl, a door for closing said bowl, means hinging said gate to swing through said bowl, means hinging said door for raising and lowering with respect to said bowl, means for raising said door, and means carried by said door and engageable with said gate during at least a portion of the raising movement of said door to swing said gate through said bowl to eject dirt therefrom.

9. In a scraper, a frame, wheels supporting said frame, a bowl carried by said frame and including a cutting blade, an auxiliary bowl supported in advance of said blade and movable toward and away from said blade to assist in retaining dirt in said bowl, means attached to said auxiliary bowl for raising and lowering said auxiliary bowl, a gate supported for movement over said bowl to eject dirt therefrom, and engaging means for imparting the movement of the auxiliary bowl to the gate after the auxiliary bowl has moved to a partially open position.

10. In a scraper, a main bowl, an auxiliary bowl supported in advance of said bowl to be loaded in conjunction with said main bowl, a gate for ejecting dirt from said main bowl between adjacent edges of said bowls, means for moving said auxiliary bowl away from said main bowl, and means connecting said gate to said auxiliary bowl to drag said gate through said bowl by movement of said auxiliary bowl concurrently with said auxiliary bowl at least during the last portion of the movement of said auxiliary bowl away from said main bowl whereby said gate is effective to eject dirt between adjacent edges of the bowls.

11. In a scraper, a main bowl, an auxiliary bowl supported in advance of said bowl to be loaded in conjunction with said main bowl, a gate for ejecting dirt from said main bowl between adjacent edges of said bowls, means for moving said auxiliary bowl away from said main bowl, and means connecting said gate to said auxiliary bowl to drag said gate through said bowl by movement of said auxiliary bowl concurrently with said auxiliary bowl only during the last portion of the movement of said auxiliary bowl away from said main bowl whereby said gate is effective to eject dirt between adjacent edges of the bowls.

ROBERT B. PRICE.